(12) United States Patent
Henzler

(10) Patent No.: US 8,779,742 B2
(45) Date of Patent: Jul. 15, 2014

(54) SWITCHED-MODE POWER SUPPLY

(75) Inventor: Stephan Henzler, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 226 days.

(21) Appl. No.: 13/359,904

(22) Filed: Jan. 27, 2012

(65) Prior Publication Data
US 2013/0193936 A1    Aug. 1, 2013

(51) Int. Cl.
*H02M 3/156*    (2006.01)
*H02M 3/157*    (2006.01)

(52) U.S. Cl.
USPC ................ 323/284; 323/283; 323/285

(58) Field of Classification Search
USPC ................ 323/282, 284, 285, 351, 283
See application file for complete search history.

(56) References Cited

U.S. PATENT DOCUMENTS

| | | | |
|---|---|---|---|
| 2007/0103126 A1 | 5/2007 | McDonald et al. | |
| 2009/0174379 A1* | 7/2009 | Lima et al. | 323/282 |
| 2009/0295346 A1* | 12/2009 | Matthews | 323/267 |
| 2010/0066323 A1* | 3/2010 | Moussaoui | 323/282 |
| 2011/0204868 A1 | 8/2011 | Buthker et al. | |
| 2012/0200271 A1* | 8/2012 | Henzler | 323/235 |

OTHER PUBLICATIONS

Guang Feng, et al., "A New Digital Control Algorithm to Achieve Optimal Dynamic Performance in DC-to-DC Converters", IEEE, vol. 11, No. 4, Jul. 2007, p. 1489-1498.

* cited by examiner

*Primary Examiner* — Gary L Laxton
(74) *Attorney, Agent, or Firm* — Eschweiler & Associates, LLC

(57) ABSTRACT

The switched-mode power supply includes a power stage, and a control unit to control the operation of the power stage based on a critical parameter of the power stage, wherein the control unit is configured to control the operation of the power stage to change from a first operational mode to a second operation mode if the critical parameter leaves a pre-defined range, and to change from the second operational mode to the first operational mode based on a measurement of a first time interval.

21 Claims, 10 Drawing Sheets

SWITCHED-MODE POWER SUPPLY

FIELD

The present invention relates to a switched-mode power supply, a power supply circuit, a direct current to direct current converter, and a method for operating a switched-mode power supply.

BACKGROUND

The power supply and voltage regulations for devices such as, for example, a central processing unit, analog/RF subsystems, a memory, systems-on-chip, or peripheral loads becomes a major challenge due to increasing demands in computing, control, and communication platforms. Recent years show an increasing demand for power supplies and power converters providing high dynamic characteristics. One important challenge to power supplies is to enable a fast response to strong load and line variations. In particular, a fast recovery time of the power supply after such load and line variations is considered to be most important. Another challenge to power supplies is to react quickly to change requests of the output voltage, e.g. dynamic voltage scaling in microprocessors.

BRIEF DESCRIPTION OF THE DRAWINGS

The accompanying drawings are included to provide a further understanding of the disclosure and are incorporated in and constitute a part of this specification. The drawings illustrate embodiments and together with the description serve to explain principles of the disclosure. Other variations and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1A:
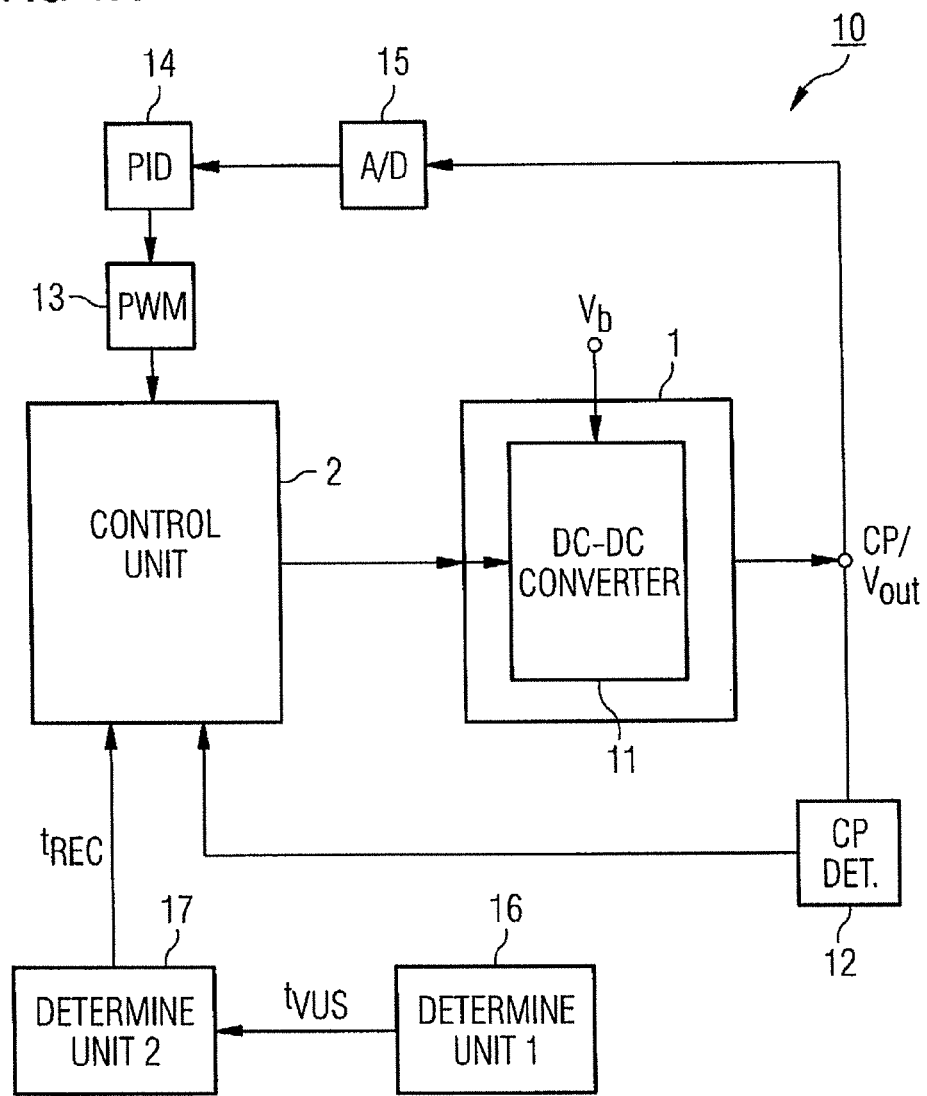
FIGS. 1a-1c illustrate a schematic block representation of a switched-mode power supply according to a first aspect (FIG. 1a), a buck converter circuit as an example of a power stage (FIG. 1b), and a boost converter circuit as another example of a power stage (FIG. 1c).

The aspects and embodiments are now described with reference to the drawings, wherein like reference numerals are generally utilized to refer to like elements throughout. In the following description, for purposes of explanation, numerous specific details are set forth in order to provide a thorough understanding of one or more aspects of the disclosure. It may be evident, however, to one skilled in the art that one or more aspects of the embodiments may be practiced with a lesser degree of the specific details. In other instances, known structures and elements are shown in schematic form in order to facilitate describing one or more aspects of the disclosure. It is to be understood that other embodiments may be utilized and structural or logical changes may be made without departing from the scope of the disclosure. It should be noted further that the drawings are not to scale or not necessarily to scale.

In addition, features or aspects disclosed may be combined with one or more other features or aspects of the other implementations as may be desired and advantageous for any given or particular application. The terms "coupled" and "connected", along with derivatives may be used. It should be understood that these terms may be used to indicate that two elements co-operate or interact with each other regardless whether they are in direct physical or electrical contact, or they are not in direct contact with each other. The following detailed description, therefore, is not to be taken in a limiting sense, and the scope of the present invention is defined by the appended claims.

In the following disclosure is directed to a switched-mode power supply or a power supply circuit. It is to be noted herewith that different kinds of power supplies can be used like, for example, direct current to direct current power converter circuits like buck converter circuits, boost converter, or buck-boost converter circuits, direct current to alternate current converter circuits, or alternate current to direct current converter circuits.

FIG. 1a illustrates a schematic block representation of a switched-mode power supply according to the disclosure. Switched-mode power supply 10 of FIG. 1 includes a power stage 1 and a control unit 2 to control the operation of power stage 1 depending on a critical parameter CP of power stage 1. Control unit 2 is configured to control the operation of power stage 1 to change from a first operational mode to a second operational mode if the critical parameter CP leaves a pre-defined range and to change from the second operational mode to the first operational mode depending on a measurement of a first time interval $T_{VUS}$.

Power stage 1 may further include a direct current to direct current power converter circuit 11, in particular a buck stage, a boost stage, or a buck-boost stage.

Figure 1B:
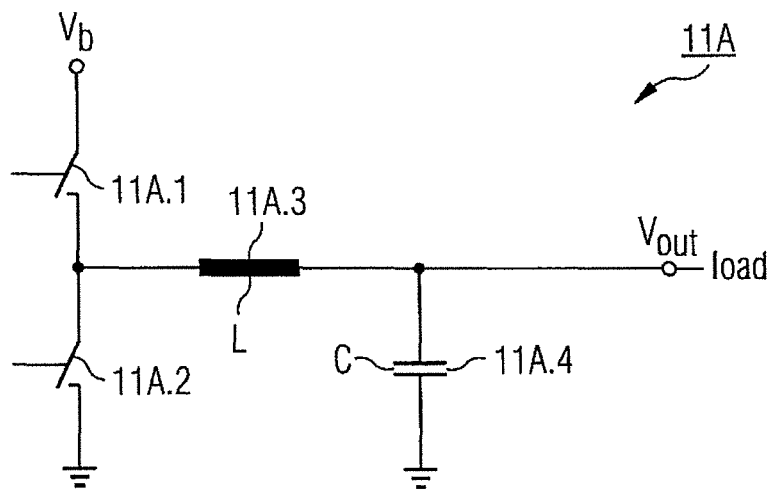

FIG. 1b illustrates an example of a buck stage 11A. Buck stage 11A comprises a first switch 11A.1, a second switch 11A.2, an inductor 11A.3, and a capacitor 11A.4. First switch 11A.1 is connected with an input voltage $V_b$. Second switch is connected with a ground potential or a second supply voltage. An output voltage $V_{out}$ is obtained at a node between inductor 11A.3 and capacitor 11A.4. When buck stage 11A is used as direct current to direct current power converter circuit 11 in FIG. 1a control unit 2 controls switches 11A.1 and 11A.2 to connect inductor 11A.3 either between the input voltage $V_b$ and the output or between the ground potential and the output. In this way the system toggles quasi-periodically between these two configurations. Buck stage 11A thus yields an output voltage $V_{out}$ which is always less than the input voltage $V_b$.

Figure 1C:
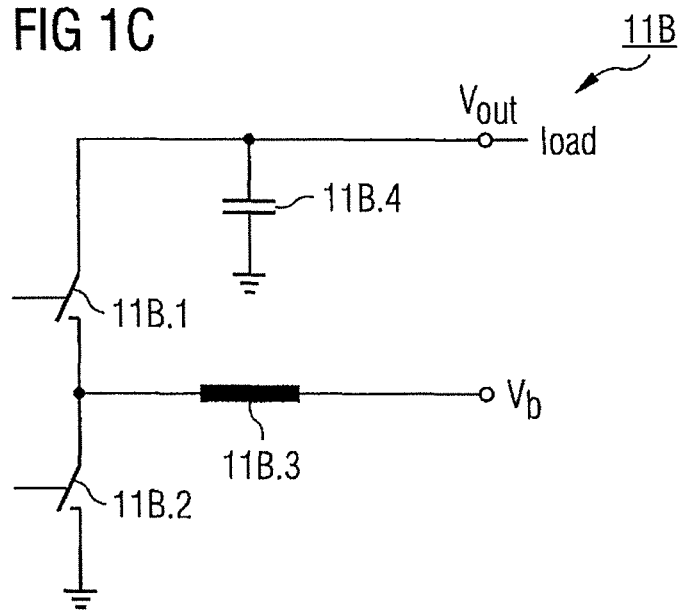

FIG. 1c illustrates an example of a boost stage 11B. Boost stage 11B has switches 11B.1 and 11B.2, an inductor 11B.3, and a capacitor 11B.4. In boost stage 11B inductor 11B.3 is coupled between the input voltage $V_b$ and the node between switches 11B.1 and 11B.2. Boost stage 11B is thus able to yield an output voltage $V_{out}$ which can be greater than the input voltage $V_b$. Boost stage 11B can be used as direct current to direct current power converter circuit 11 in FIG. 1a.

For power supply module 10 of FIG. 1a, the critical parameter CP can be a function of the output voltage $V_{out}$ of power stage 1.

Power supply 10 may also include a pulse width modulator 13 to execute the first operational mode. Pulse width modulator 13 can also be connected with an analog-to-digital (A/D) converter 15 and a PI (proportional-integral) or PID (proportional-integral-differential) (or PID with non-linear enhancements or non-linear) compensator 14. A/D converter 15 can be connected with the output of power stage 1. The first operational mode may be a normal operational mode of power supply 10 when the output voltage $V_{out}$ is in the pre-defined range. The first operational mode can also be implemented in an analogous manner in which case an A/D converter 15 is not used and an analog compensator 14 would be used which can be connected with the output of power stage 1.

Power supply 10 may further include a critical parameter detector 12, for example, an output voltage threshold detector, configured to detect when output voltage $V_{out}$ leaves the pre-defined range. Critical parameter detector 12 may be connected to the output of power stage 1. It may also be connected to control unit 2 and it may be configured to send a respective information, for example a digital or analog signal, to control unit 2. In particular, critical parameter detector 12 may also be configured to detect if critical parameter CP re-enters the pre-defined range and to send a respective information, for example a digital or analog signal, to control unit 2.

Power supply 10 may further include a first time determination unit 16 to determine a length of a first time interval $T_{vus}$ during which critical parameter CP is out of the pre-defined range. Power supply 10 may further include a second time determination unit 17 to determine a length of a second time interval $T_{rec}$ depending on first time interval $T_{vus}$, wherein control unit 2 determines a change of operation of power stage 1 from the second operational mode to the first operational mode depending on second time interval $T_{rec}$. First time determination unit 16 can be connected with second time determination unit 17 and second time determination unit 17 can be connected with control unit 2. It will be shown later in more detail that first time determination unit 16 may obtain first time interval $T_{vus}$ by measuring the time in which output voltage $V_{out}$ is out of the pre-defined range, and that second time determination unit 17 obtains second time interval $T_{rec}$ on the basis of a calculation according to a formula including first time interval $T_{vus}$. First time determination unit 16 may be implemented as a measurement unit, and second time determination unit 17 may be implemented as a prediction and/or calculation unit.

Control unit 2 may be configured to execute the second operational mode during a first phase to turn first switch 11A.1 of buck stage 11A on and second switch 11A.2 of buck stage 11A off and during a second phase to turn first switch 11A.1 off and second switch 11A.2 on.

Control unit 2 may be configured to execute the second operational mode during a first phase to turn second switch 11B.2 of boost stage 11B on and first switch 11B.1 of boost stage 11B off and during a second phase to turn first switch 11B.1 on and second switch 11B.2 off and during a third phase to keep first switch 11B.1 on and second switch 11B.2 off.

Figure 2:
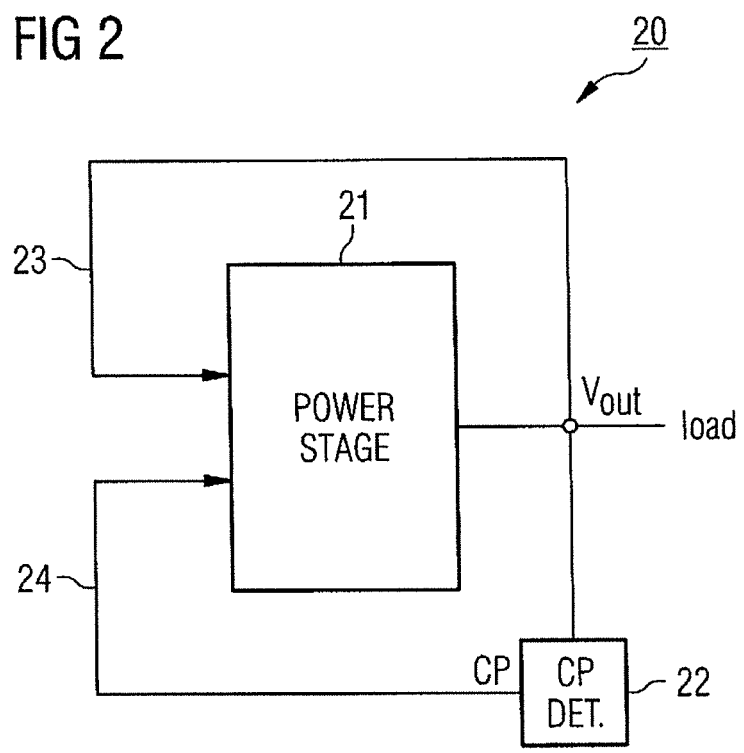
FIG. 2 illustrates a schematic block representation of a power supply circuit according to a second aspect.

FIG. 2 illustrates a schematic block representation of a power supply circuit 20 according to a second aspect. The power supply circuit 20 comprises a power stage 21 and a critical parameter detector 22 to detect a critical parameter of power stage 21. Power supply circuit 20 further includes a first control loop 23 configured to control the operation of power stage 21 according to a first operational mode. Power supply circuit 20 further comprises a second control loop 24 coupled to critical parameter detector 22 and configured to control the operation of power stage 21 according to a second operational mode.

Power stage 21 of power supply circuit 20 may, for example, be comprised according to the examples shown and described above with respect to power stage 1 of FIGS. 1a, 1b, and 1c.

Critical parameter detector 22 of power supply circuit 20 may be configured to detect if critical parameter CP, in particular an output voltage $V_{out}$ of power stage 21, leaves a pre-determined range, and to detect if critical parameter CP re-enters the pre-determined range. Critical parameter detector 22 may be implemented as a threshold detector that detects if critical parameter exceeds a certain threshold in the positive or negative direction.

Power stage 21 may include a direct current to direct current converter according to the examples of FIG. 1a or 1b. Accordingly power stage 21 may include a first switch and a second switch (not shown in FIG. 2) and first control loop 23 may be configured to operate power stage 21 in a regular mode by opening and closing the first switch and the second switch in an alternate manner. Furthermore, second control loop 24 may be configured during a first phase to turn the first switch on and the second switch off and during a second phase to turn the first switch off and the second switch on.

Further examples of power supply circuit 20 can be formed with anyone of the features and embodiments that were described above in connection with switched-mode power supply 10 of FIG. 1. For instance the second control loop 24 may be configured to initiate several phases where a first set of switches is turned on and several phases where a second set of switches is turned on in a time interleaved manner before giving back control to the first control loop 23 and the first operation mode respectively.

Figure 3:
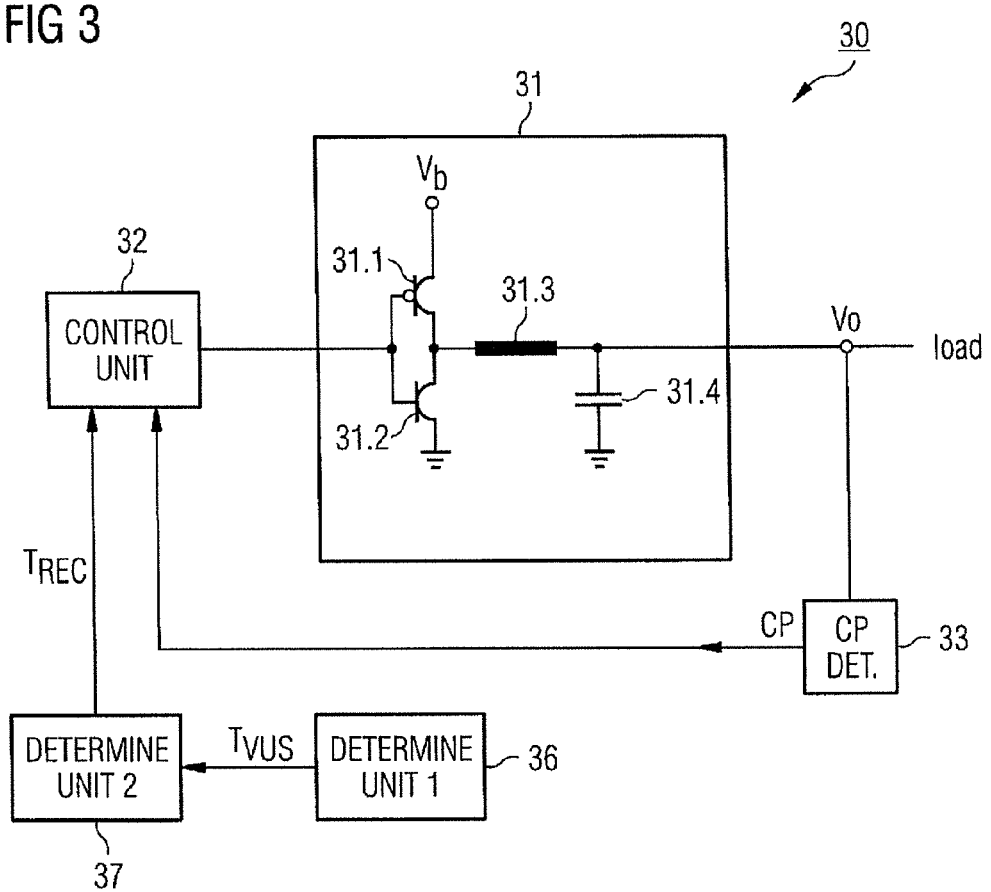
FIG. 3 illustrates a schematic block representation of a direct current to direct current converter according to a third aspect.

FIG. 3 illustrates an exemplary direct current to direct current (DC-DC) converter 30 according to a third aspect of the disclosure. DC-DC converter 30 comprises a power stage 31 having a first switch 31.1, a second switch 31.2, an inductor 31.3 and a capacitor 31.4. DC-DC converter 30 further includes a critical parameter detector 33 to detect a critical parameter CP of power stage 31, and a control unit 32 configured to control the operation of the first switch 31.1 and the second switch 31.2 and to change the operation from a first operational mode to a second operational mode if the critical parameter leaves a pre-determined range and to change from the second operational mode to the first operational mode depending on a measurement of a first time interval $T_{VUS}$.

Critical parameter detector 33 of the DC-DC converter 30 may be connected to control unit 32 to send an information like, for example, a digital or analog signal, to control unit 32 if critical parameter CP leaves the pre-determined range, and also if critical parameter CP re-enters the pre-determined range.

Control unit 32 of DC-DC converter 30 may also be configured to change the operation from the second operational mode to the first operational mode if the critical parameter has re-entered or is within the pre-defined range and a current flowing through the inductor 31.3 has reached a pre-determined level.

DC-DC converter 30 may further include a first time determination unit 36 to determine a length of first time interval $T_{vus}$ during which critical parameter CP is out of the pre-defined range. In addition, DC-DC converter 30 may further include a second time determination unit 37 to determine a length of a second time interval $T_{rec}$ depending on the first time interval $T_{vus}$, wherein control unit 32 determines a change of operation of the power stage 1 from the second operational mode to the first operational mode depending on the second time interval $T_{rec}$. First time determination unit 36 may be implemented as a measurement unit, and second time determination unit 37 may be implemented as a prediction and/or calculation unit.

Further embodiments of DC-DC converter 30 can be formed with anyone of the features and embodiments as described in connection with the switched-mode power supply 10 of FIG. 1 or the power supply circuit 20 of FIG. 2.

Figure 4:
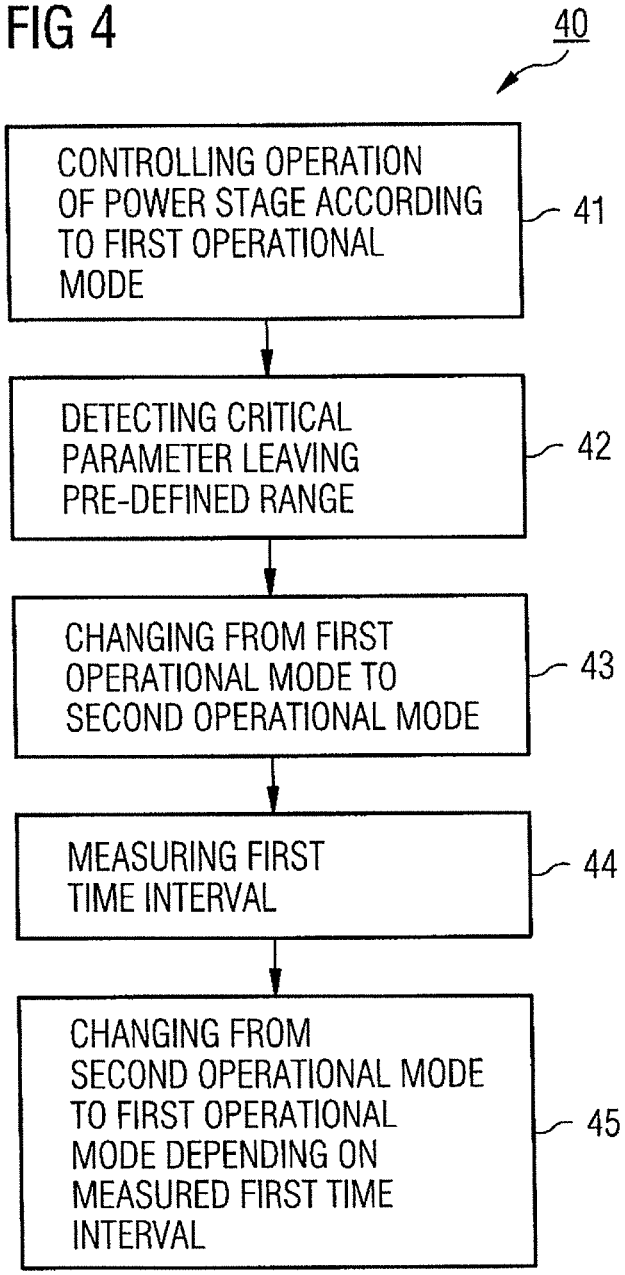
FIG. 4 illustrates a flow diagram for an exemplary method for operating a switched mode power supply according to the disclosure.

FIG. 4 illustrates a flow diagram of an exemplary method for operating a switched-mode power supply or a power supply circuit according to a fourth aspect of the disclosure, wherein the switched-mode power supply comprises a power stage 1 or 21. Process 40 includes controlling the operation of the power stage 1 according to a first operational mode or a second operational mode at 41, detecting the critical parameter CP at 42, changing from the first operational mode to the second operational mode if the critical parameter leaves the pre-defined range at 43. The method further comprises measuring a first time interval $T_{vus}$ at 44, and changing from the second operational mode to the first operational mode depending on the measured first time interval $T_{vus}$ at 45.

In accordance with exemplary process 40, critical parameter CP can be a function of the output voltage $V_{out}$ of power stage 1. As long as the output voltage $V_{out}$ is within the pre-defined range, power supply 10 operates in a regular mode. When the output voltage $V_{out}$ exceeds a threshold in the positive or negative direction, the operation of power stage 1 is changed to a second operational mode. Thereafter the operation of power stage 1 is changed again to the first operational mode depending on the measured first time interval $T_{vus}$.

According to an aspect of process 40, the pre-defined condition may be met if critical parameter CP has re-entered or is within the pre-defined range and in addition if a current flowing through inductor 11A.3 has reached a pre-determined level which can be determined by measurement of the first time interval $T_{vus}$ and a calculation based on the measured first time interval $T_{vus}$.

According to an aspect of process 40, power stage 1 comprises a first switch 11A.1 and a second switch 11A.2 and process 40 further includes controlling the operation of power stage 1 according to the second operational mode by turning first switch 11A.1 on and second switch 11A.2 off during a first phase and turning first switch 11A.1 off and second switch 11A.2 on during a second phase.

Process 40 may further include measuring a length of a first time interval $T_{vus}$ during which the critical parameter is out of the pre-defined range. In particular, process 40 may further include determining a length of a second time interval $T_{rec}$ based on the first time interval $T_{vus}$, during which second time interval $T_{rec}$ a current flowing through the inductor 11A.3 reaches a pre-determined level.

As will be shown in a more detailed embodiment later, the first time interval $T_{vus}$ may be determined by a measurement procedure and the second time interval may be determined by a calculation procedure based on the first time interval.

Further embodiments of the process 40 can be formed by incorporating anyone of the features and embodiments that were described in connection with switched-mode power supply 10 of FIG. 1, power supply circuit 20 of FIG. 2, and DC-DC converter 30 of FIG. 3.

Figure 7:
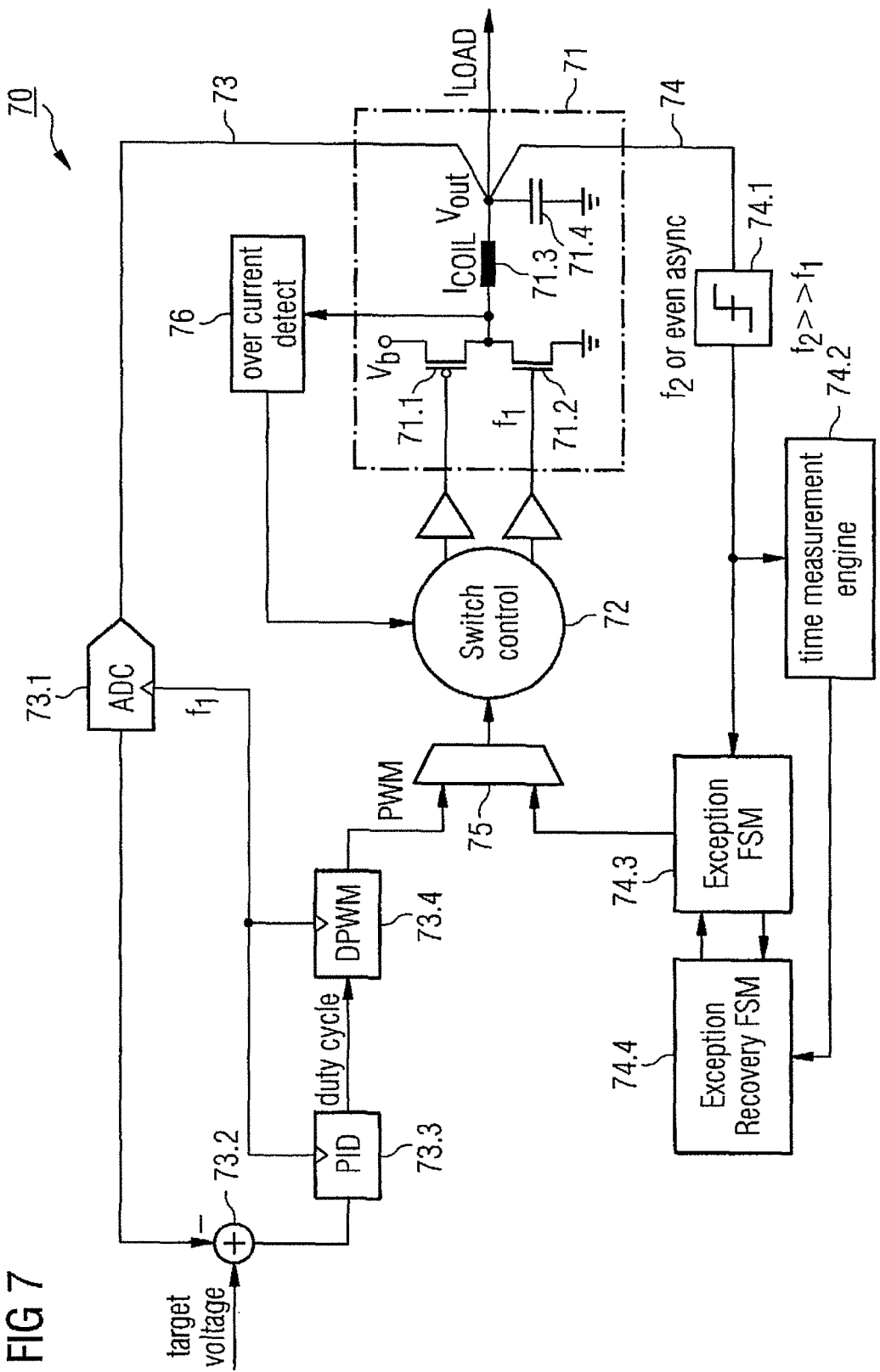
FIG. 7 illustrates an exemplary electronic circuit of a switched-mode power supply according to the disclosure.

FIG. 7 illustrates an exemplary electronic circuit of a buck stage 70 according to the disclosure. Buck stage 70 includes a buck stage power stage 71 provided to convert a battery voltage $V_b$ to an output voltage $V_{out}$. Power stage 71 includes a first, high-side switch 71.1 connected to the input voltage $V_b$, a second, low-side switch 71.2 connected to the ground potential, an inductor coil 71.3, and an output capacitor 71.4 connected to the ground potential such as was shown in FIG. 1b. Buck converter 70 further includes a switch control unit 72 provided to control the operation of switches 71.1 and 71.2.

Buck converter 70 further includes a first control loop 73 for the first, regular, operational mode and a second control loop 74 for the second operational mode. First control loop 73 includes an analog-to-digital converter (ADC) 73.1 operating at a first frequency $f_1$ to convert the analog value of output voltage $V_{out}$ into a digital value. The digital value is supplied to a difference forming device 73.2 where a difference is formed between a target voltage and the actual measured output voltage. The difference value is supplied to a PID (proportional-integral-differential) compensator 73.3 which generates information on how to change the duty cycle which is supplied to a pulse width modulator (PWM) 73.4. In an analog implementation there would be no ADC 73.1 but instead an analog compensator coupled to the output voltage $V_{out}$ and to the PWM 73.4.

Second control loop 74 includes a threshold detector 74.1 detecting whether the output voltage $V_{out}$ exceeds a lower or an upper threshold. The threshold detector 74.1 is, for example, operated at a second frequency $f_2$ where $f_2 \gg f_1$ or the threshold detector 74.1 can also be operated in an asynchronous manner. In case that output voltage $V_{out}$ exceeds one of the two threshold levels, threshold detector 74.1 outputs a corresponding signal to a time measurement engine (first time determination unit) 74.2. When output voltage $V_{out}$ re-enters the pre-defined range around the target voltage again, threshold detector 74.1 again outputs a corresponding signal to time measurement engine 74.2. Time measurement and calculation engine 74.2 is provided to determine a length of a first time interval $t_{vus}$ (first phase or exception phase) during which output voltage $V_{out}$ is outside the pre-defined range.

Time measurement and calculation engine 74.2 may also be configured to calculate the length $t_{rec}$ of the second time interval (second phase or recovery phase) on the basis of the first time interval $t_{vus}$ based on a formula which will be set out further below. Upon receipt of a first signal from threshold detector 74.1 that output voltage $V_{out}$ has exceeded a threshold level, a respective signal is sent to time measurement and calculation engine 74.2 and also to a first finite state machine 74.3 in order to place first finite state machine 74.3 in a particular state so that it outputs a signal to a multiplexer 75. Thereupon the signal is put through the multiplexer 75 to switch control 72 upon which the second operational mode is started by switch control 72 putting out a signal to turn on the first, high-side switch 71.1. When the threshold detector indicates that the output voltage has crossed a second threshold level a signal is sent to the time measurement engine to stop the time measurement engine 74.2. The second threshold may be identical to the first threshold. Further a signal is sent to a first finite state machine 74.3 in order to place first finite state machine 74.3 in a particular state so that it outputs a signal to a multiplexer 75. A output signal from the multiplexer is sent to a switch control 72 which (in the case of a buck converter) turns off the first, high side switch 71.1 and turns on the second, low side switch 71.2. Then time measurement and calculation engine 74.2 calculates the length of the second time interval $t_{rec}$ of the second operational mode and as soon as the end of the time interval $t_{rec}$ has been reached, time measurement and calculation engine 74.2 outputs a respective signal to a second finite state machine 74.4 to put second finite state machine 74.4 in a particular state so that it sends out a signal to first finite state machine 74.3 thereby altering the state of first finite state machine 74.3 so that first finite state machine 74.3 sends out a signal to multiplexer 75 to trigger switch control 72 to return back to the regular, first operational mode. The two finite state machines 74.3 and 74.4 may be essentially identical with control unit 2 shown in FIG. 1a. The second finite state machine 74.4 actually takes care that second switch 71.2 is activated for the recovery time after the voltage has re-entered the pre-defined voltage range. It should be added here that the functionalities of the two finite state machines 74.3 and 74.4 can also be merged into a single finite state machine. It is also possible that the length of the recovery phase is determined by the length of the exception phase and the actual duty cycle information provided by PID compensator 73.3.

Instead of calculating the length $t_{rec}$ of the second time interval of the second operational mode, it is also possible to measure the current flowing through inductor coil 71.3 with a current detector 76 and to output a signal to switch control 72 as soon as the measured current has reached a pre-determined level. For example, both the coil current and the load current can be measured and compared with each other and as soon as the two currents have reached an approximately equal level, a signal can be output to switch control 72 in order to return to the first regular mode of operation of power supply.

ADC 73.1 may only have a limited operation range. Within this operation range first loop 73 compensates the output frequency deviations relatively slowly, i.e. with a relatively low frequency $f_1$, but with a relatively high accuracy with the help of PID compensator 73.3. As soon as output voltage exceeds the pre-defined range, first loop 73 is deactivated. Instead, the second loop 74 is activated and threshold detector 74.1 of second loop 74 operates at a much higher frequency $f_2 \gg f_1$ so that a threshold crossing of the output voltage will be very quickly detected by threshold detector 74.1 which means that shortly after detecting the threshold crossing the second operational mode will be initiated by turning on first, high-side switch 71.1 an so on.

Figure 5:
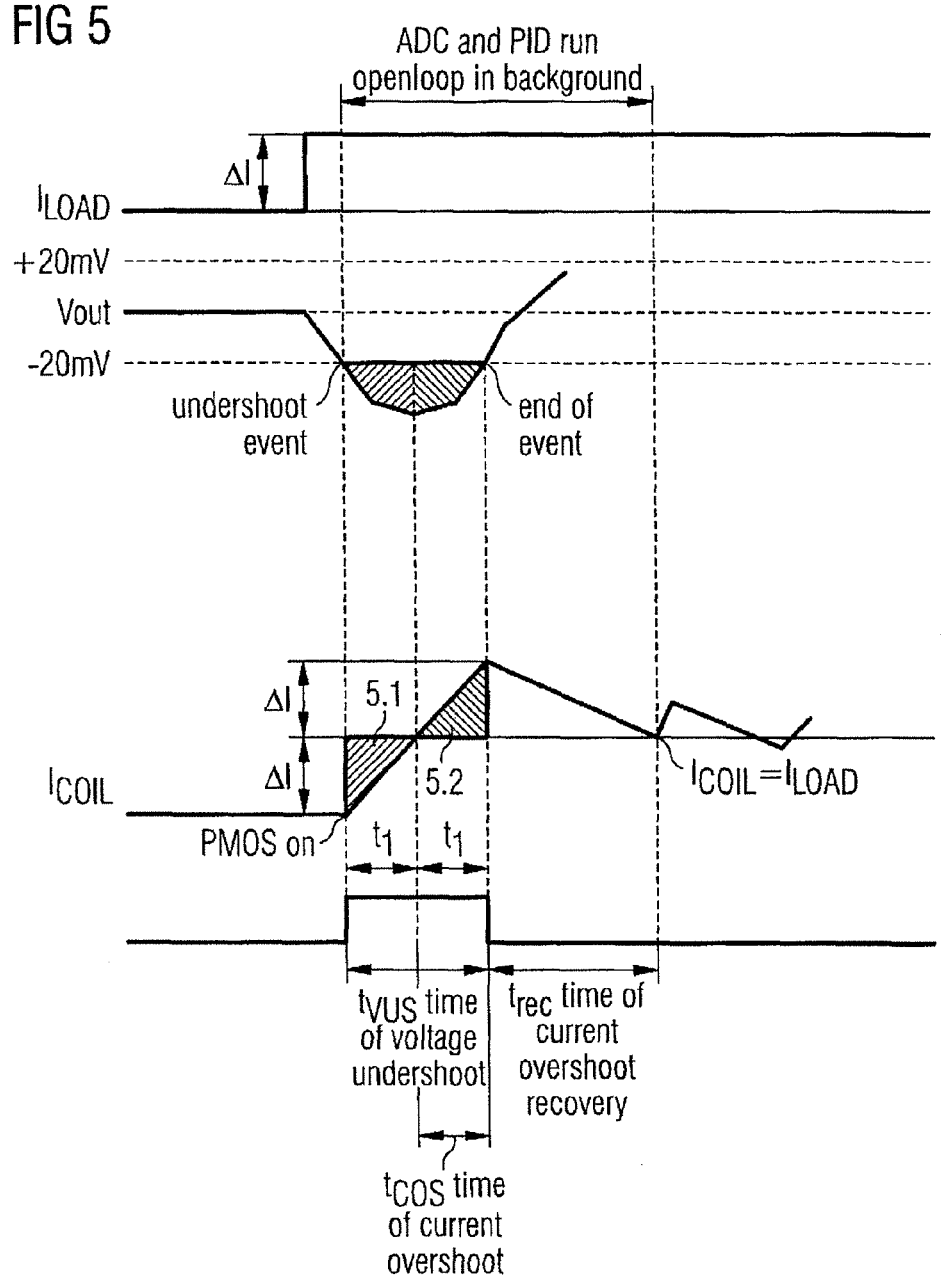
FIG. 5 illustrates a timing diagram showing time-dependent variation of parameters of the power supply according to an example of the method.

FIG. 5 illustrates a timing diagram to show the time-dependent variation of different parameters of power stage 71 in the case of a sudden increase of the load current. The timing diagram of FIG. 5 includes also an example for determining the length of the second phase $t_{rec}$ of the second operational mode. As described earlier and also shown in FIG. 7, in steady state a certain desired output voltage $V_{out}$ is generated. An output voltage sensor like, for example, A/D converter 73.1 measures the actual output voltage, feeds it to PID compensator 73.3 which generates the required duty cycle to keep output voltage $V_{out}$ constant. DPWM generator 73.4 translates this duty cycle information into a pulse width modulated signal with the respective duty cycle. When the load current $I_{LOAD}$ changes strongly as shown in the uppermost curve of FIG. 5, output voltage $V_{out}$ drops and may cross a pre-defined threshold. If, for example, a 1.8 V target output voltage shall be generated, a lower threshold of 1.78 V and an upper threshold of 1.82 V, for example, may be defined. These thresholds are monitored either asynchronously, with the same measurement rate used in output voltage sensor, or with a different measurement rate like, for example, with a higher measurement rate than the output voltage sensor. As soon as a threshold voltage crossing is detected, the regular control loop (first operational mode) is broken and power supply 10 changes to a second operational mode. This is the case when the load current increases strongly so that output voltage $V_{out}$ drops and may cross the pre-defined threshold of −20 mV below the target voltage of e.g. 1.8 V. The threshold crossing is detected by the threshold detector 74.1 which outputs a signal to time measurement engine 74.2 and to first FSM 74.3 thereby setting first FSM 74.3 in a state so that it outputs a signal to multiplexer 75 whereupon multiplexer 75 causes switch control 72 to turn high-side power switch 71.1 (first switch) on and low-side power switch 71.2 off. During the first phase (exception phase) of the second operational mode the high-side switch 71.1 is turned on and low-side switch 71.2 is turned off. When the output voltage crosses the threshold again (this time in the opposite direction), a second phase (recovery phase) of the second operational mode is started. It should be noted that the threshold for re-entering can be different from the threshold for leaving or, in other words, different voltage ranges can be pre-defined for leaving and re-entering. Anyway the threshold crossing is again detected by threshold detector 74.1 which outputs a signal to time measurement engine 74.2 and to first FSM 74.3 thereby setting first FSM 74.3 in a state so that it outputs a signal to multiplexer 75, whereupon multiplexer 75 causes switch control 72 to turn off high-side 71.1 switch and turn on low-side switch 71.2. In the first phase, due to the opening of high-side switch 71.1, the current $I_{COIL}$ flowing through coil 71.3 starts to increase. Output voltage $V_{out}$ continues to fall until the coil current $I_{COIL}$ compensates the load current. If this is the case output voltage $V_{out}$ starts to increase again. Then the second phase of the second operational mode is started when output voltage $V_{out}$ crosses the threshold again which is indicated by the arrow "end of event". In particular, in the second phase high-side switch 71.1 is turned off and low-side switch 71.2 is turned on as described above. The purpose of this second phase is the following. In principle the control could be given back to the regular control loop 73, i.e. the first operational mode, as soon as output voltage $V_{out}$ is in the pre-defined region again. The difficulty, however, is that in this situation the coil current is much too high. A direct handover to the regular first control loop 73 would either mean that a potential upper voltage limit is hit immediately, causing yet another exception or that the first control loop 73 reacts strongly in the opposite direction so that the threshold is crossed again. In both cases the handover to the regular control loop 73 would fail. Hence, it is required to bring the coil current back to a reasonable value before the handover takes place.

The following considerations can be made to estimate the length of the second phase of the second operational mode by first time determination unit 16 and second time determination unit 17. After a load jump output voltage $V_{out}$ starts to drop. When the predefined −20 mV threshold is crossed, high-side switch 71.1 is turned on (indicated by the arrow "PMOS on") independent of the current state of the buck stage 71. As a consequence, the coil current rises until it is equal to the load current. In the time interval $t_1$ between the threshold crossing (indicated by the arrow "undershoot event") and the time instance where the load current is equal to the coil current, an amount of charge (drawn as left-hatched area 5.1) is taken from output capacitor 71.4. In order to bring the output voltage back to the threshold voltage, about the same amount of charge must be added to capacitor 71.4 which is indicated by a right-hatched area 5.2. FIG. 5 illustrates that it takes the same time $t_1$ to replace this charge by current flowing to the capacitor 74.1. By geometric analysis it can be seen that the coil current is then twice the load current. This is much too high for a smooth handover. In reality the factor of 2 is not exact because the current wave form is not perfectly linear and because of parasitic elements in series to output capacitor 71.4. Power stage 71 is now controlled in such a way that the coil current is reduced to a reasonable level, namely wherein switch control 72 turns off first switch 71.1 and turns on second switch 71.2 during the second phase $t_{rec}$. Thereafter the handover to the regular control loop 73 can be initiated. A reasonable current is for instance the load current (indicated by the arrow "$I_{coil}=I_{load}$"). The length of the second phase $t_{rec}$ can be determined as follows:

a) Slope ratio of rising current and falling current is known or can be computed by, for example, the second time determination unit 17, from the output voltage and the battery voltage:

$$(di_{rise}/dt)/(di_{fall}/dt)=(Vb-V_{out})/V_{out} \quad (1)$$

b) Time interval $t_{vus}$ is measured (e.g. by the first time determination unit 16 which may include a time measurement circuit including e.g. a counter or a time-to-digital converter). Time interval $t_{vus}$ indicates how long output voltage $V_{out}$ is below the threshold.

c) Time interval $t_{rec}$ is computed by, for example, the second time determination unit 17, during which time interval $t_{rec}$ the low-side switch 71.2 must be turned on to reduce the coil current to the load current according to $$t_{rec}=(Vb-V_{out})/V_{out} \times k \times t_{vus} \quad (2)$$

wherein $V_{out}$ is the nominal or desired output voltage. Under ideal conditions the scaling factor k=0.5 but may differ in an actual implementation.

d) In the example shown in FIG. 1a, the second time determination unit 17 calculates $t_{rec}$ according to the above formula and when $t_{rec}$ has lapsed puts out a signal to control unit 2 which changes operation of power stage back to the first operational mode. In the example shown in FIG. 7, second FSM 74.4 makes the calculation and when $t_{rec}$ has lapsed puts out a signal to first FSM 74.3, thereby setting first FSM 74.3 in a state so that it puts out a signal to multiplexer 75, thereby causing switch control unit 72 to return to the first operational mode, i.e. to drive switches 71.1 and 71.2 according to PWM signals received from PWM 73.4 of the first regular loop 73.

e) The ADC 73.1 and the compensator 73.3 may continue operation while the second control loop is turning the switches of the power stage 71 on and off. Operation of the compensator 73.3 during the second control mode has no effect on the switches but on internal states of the compensator and the duty cycle.

In an exemplary implementation the power stage 71 consists of several phases, e.g. N phases. Each phase has power switches 71.1.N and 71.2.N connected to coils 71.3.N. In a first operational mode the phases may have a defined phase relation, e.g. subsequent phases may have a mutual phase difference of $(2 \times \pi/N)$. In the second operational mode, i.e. when the critical parameter exceeds a threshold the phase difference may be different from the phase difference in the first operational mode. For example the phase difference of at least two phases may be zero. During the transition from the second operational mode to the first operational mode the phase difference is restored to the original condition. The sequence of bringing the various phases to their desired phase condition may be fixed, random, or alternating.

Figure 8:
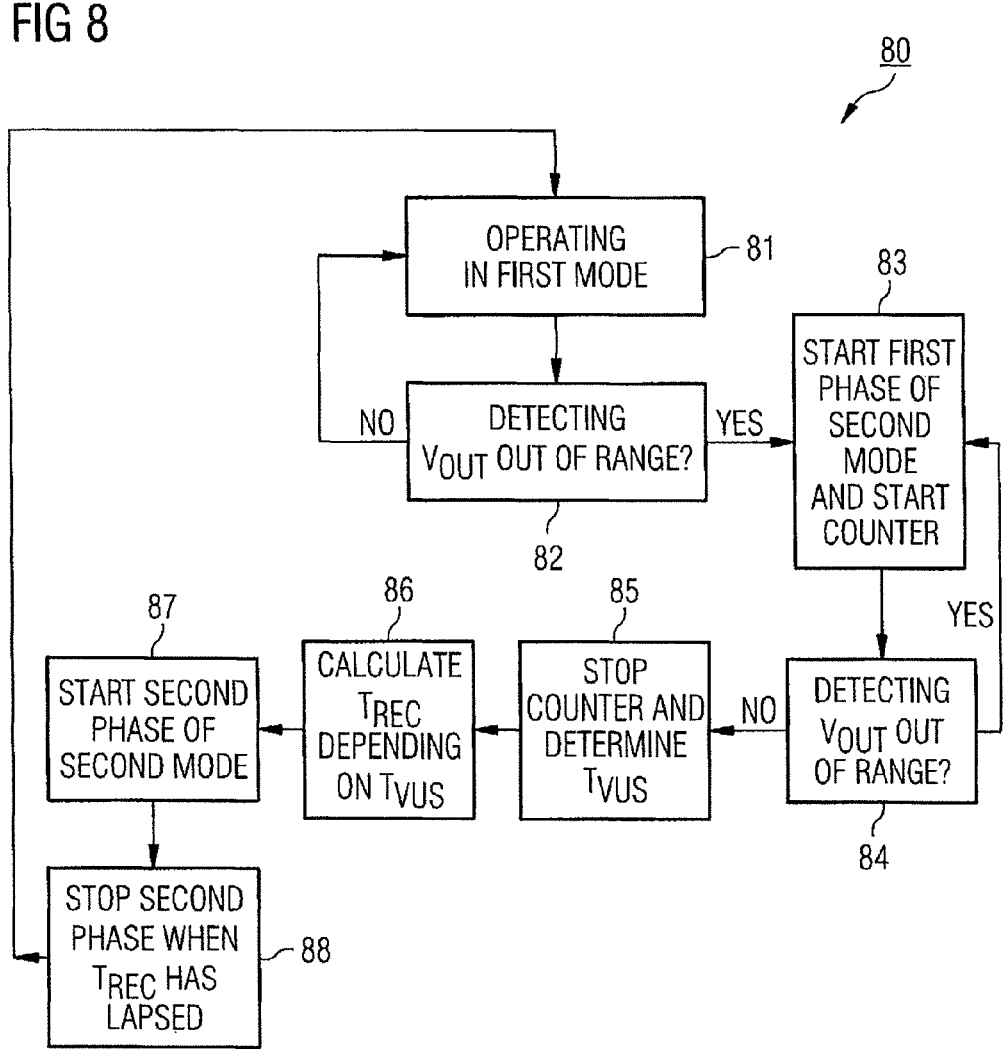
FIG. 8 illustrates a flow diagram for an exemplary method for operating a switched mode power supply according to the disclosure.

FIG. 8 shows a flow diagram of an exemplary process 80. Box 81 indicates the normal operation of buck stage 71 according to a first operational (regular) mode in a first loop 73. In regular time intervals determined by frequency $f_2$ process 80 moves to box 82 where threshold detector 74.1 detects whether output voltage $V_{out}$ is still within the pre-determined range. If threshold detector 74.1 detects that output voltage $V_{out}$ is out of the pre-determined range (YES at 82), process 80 moves to box 83 where the second operational mode is initiated. More specifically, in box 83 the first phase or first time interval of the second operational mode is started by threshold detector 74.1 outputting a signal to time measurement engine 74.2 and to first FSM 74.3, which outputs a signal to multiplexer 75, whereupon switch control turns first switch 71.1 on and second switch 71.2 off. At the same time, time measurement engine 74.2 starts a time measurement. Then the process 80 moves in regular time intervals determined by frequency $f_2$ to box 84 where threshold detector 74.1 detects whether output voltage $V_{out}$ is still out of range. If threshold detector 74.1 detects that output voltage $V_{out}$ is still out of range (YES at 84), process 80 returns to box 83 in the sense that the first phase of the second operational mode is continued and nothing is changed. If, however, threshold detector 74.1 detects that output voltage $V_{out}$ is again within the range (NO at 84), process 80 moves to box 85 where the time counter is stopped. More specifically, threshold detector 74.1 outputs a signal to first FSM 74.3 and to time measurement engine 74.2 which stops time counter and determines the first time interval $t_{vus}$ in which output voltage $V_{out}$ was out of the pre-defined range. Then process 80 moves to box 86 in which second FSM 74.4 calculates the second time interval $t_{rec}$ depending on $t_{vus}$ according to above formula (2). Process 80 then moves to box 87 where the second phase or second time interval of the second operational mode is started. More specifically, first FSM 74.3 having received the signal from threshold detector 74.1, outputs a signal to multiplexer 75 whereupon switch control 72 turns first switch 71.1 off and second switch 71.2 on. When the second time interval $t_{rec}$ has lapsed, process 80 moves to box 88 where the second phase is stopped and process 80 moves back to box 81 where the first regular mode is started again. More specifically, second FSM 74.4 outputs a signal to first FSM 74.3 which outputs a signal to multiplexer 75 whereupon switch control 72 is caused to operate according to first operational mode by receiving PWM signals from PWM 73.4

Figure 6:
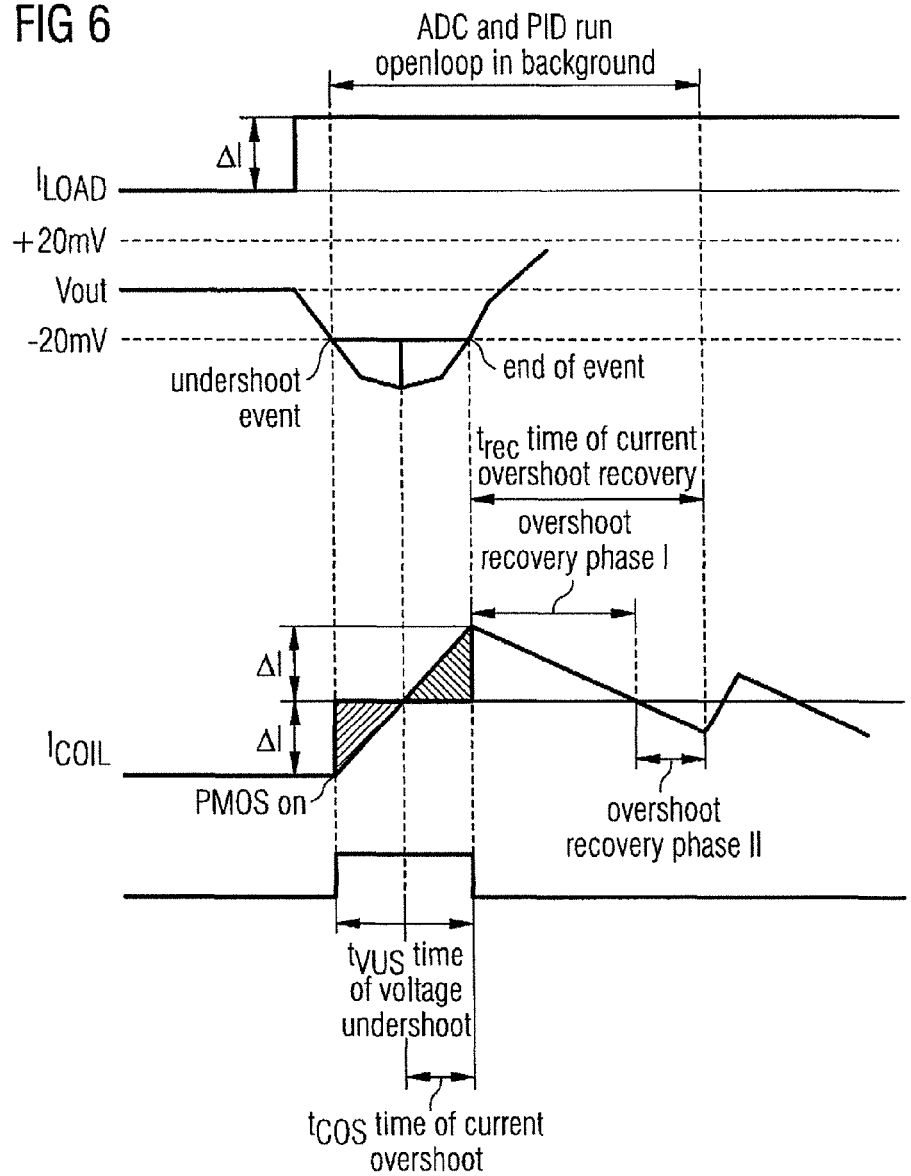
FIG. 6 illustrates a timing diagram showing time-dependent variation of parameters of the power supply according to an example of the method.

FIG. 6 illustrates a time diagram showing the time-dependent variations of different parameters of the buck stage 71 to illustrate an embodiment. The time diagram of FIG. 6 also includes another example for determining the length of the second phase $t_{rec}$ of the second operational mode. Therefore in the following only the difference as to the example as depicted in FIG. 5 will be outlined. A difference is that the length of the second phase t of the second operational mode is not determined by the above equation (2) but is instead prolonged by a certain period of time. When the second phase as of the example of FIG. 5 can be called a first recovery phase (or "overshoot recovery phase I" in FIG. 6), then the additional period of time of the example of FIG. 6 can be called a second recovery phase (or "overshoot recovery phase II in FIG. 6). The reason for this additional recovery phase is that if the coil current is only reduced to the load current, it may be still too large in a subsequent cycle due to current ripple. Hence it may be desirable to reduce the coil current even more taking the duty cycle information of the first closed loop duty cycle into account. A reasonable approach would be a length of the second phase amounting to (duty-cycle/2*fall/rise ratio)*T where T is the period of a switching cycle in the first control mode.

It is also possible to prolong the first phase of the second operational mode. The first phase as of the example of FIG. 5 can be called the exception phase. This exception phase can be prolonged by a so-called bring back time beyond the second threshold event when the output voltage again crosses the lower threshold value of −20 mV as shown in FIG. 5. In this example the coil current rises even more than in the example of FIG. 5. Then the second phase, the recovery phase, is initiated but will be terminated at the same point in time as that shown in the example of FIG. 5 from which point on the duty cycle is provided again by PID compensator according to the first operational mode. The bringback time can be constant, programmable, or adaptive.

Figure 9:
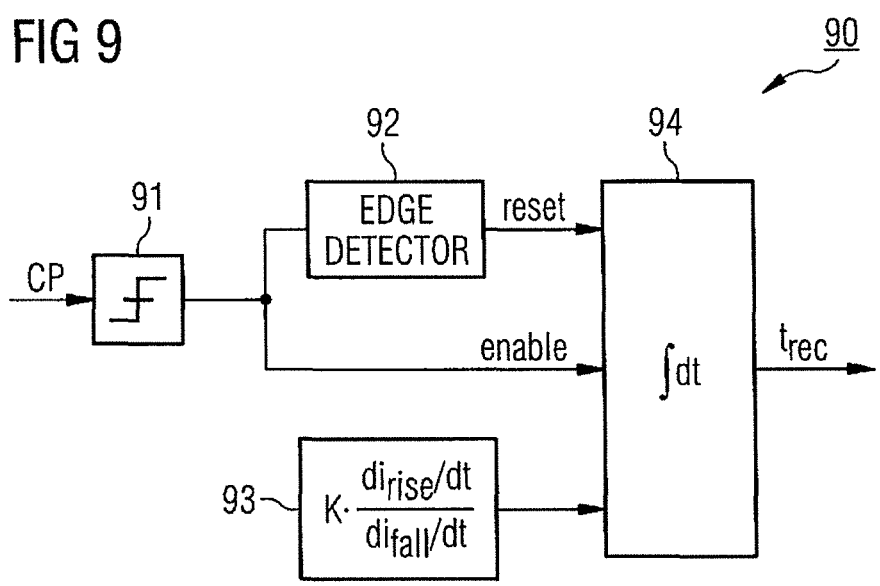
FIG. 9 illustrates a schematic block representation of an exemplary implementation of a combined time measurement and calculation engine according to the disclosure.

FIG. 9 shows an exemplary implementation of a combined time measurement and calculation engine 90. Combined time measurement and calculation engine 90 includes a threshold detector 91, an edge detector 92, a calculation unit 93 for calculating the factor $k \times (di_{rise}/dt)/(di_{fall}/dt)$, and an integrator 94. The critical parameter CP, for example the output voltage $V_{out}$, is supplied to an input of threshold detector 91. An output of threshold detector 91 is coupled to an input of edge detector 92. An output of edge detector 92 is coupled to a first input of integrator 94 for delivering a reset signal to integrator 94. The output of threshold detector 91 is also coupled to a second input of integrator 94 for delivering an enable signal to integrator 94. An output of calculation unit 93 is coupled to a third input of integrator 94. Integrator 94 calculates the second time interval $t_{rec}$. When critical parameter CP crosses the threshold, integrator 94 is reset either to zero or to a pre-defined offset value. While critical parameter CP is out of range, i.e. between a threshold crossing in a first direction and a subsequent threshold crossing in the other direction, integrator 94 integrates the factor $k \times (di_{rise}/dt)/(di_{fall}/dt)$. This factor may be pre-calculated or adjusted dynamically by calculation unit 93. Advantageous of this implementation example is the implicit time measurement and multiplication.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A switched-mode power supply, comprising:
   a power stage;
   a control unit configured to control the operation of the power stage based on a critical parameter of the power stage,
   wherein the control unit is configured to control the operation of the power stage to change from a first operational mode to a second operational mode if the critical parameter leaves a pre-defined range, and to change from the second operational mode to the first operational mode based on a measurement of a first time interval; and
   a critical parameter detector, a first time determination unit, and a second time determination unit configured to execute the second operational mode.

2. The switched-mode power supply according to claim 1, wherein the power stage comprises a buck stage or a boost stage comprising a first switch, a second switch, an inductor, and a capacitor.

3. The switched-mode power supply according to claim 1, wherein the critical parameter is a function of an output voltage of the power stage.

4. The switched-mode power supply according to claim 1, further comprising:
   a pulse width modulator configured to execute the first operational mode of the power stage.

5. The switched-mode power supply according to claim 1, wherein the critical parameter detector is further configured to detect if the critical parameter leaves the pre-defined range and to send a respective signal to the control unit in response thereto.

6. The switched-mode power supply according to claim 5, wherein
   the critical parameter detector is further configured to detect if the critical parameter re-enters the pre-defined range and to send a respective signal to the control unit in response thereto.

7. The switched-mode power supply according to claim 1, wherein the first time determination unit is configured to determine a length of the first time interval during which the critical parameter is out of the pre-defined range.

8. The switched-mode power supply according to claim 7, wherein the second time determination unit is configured to determine a length of a second time interval based on the first time interval, during which second time interval the critical parameter is within the pre-defined range and after which second time interval the control unit changes the operation of the power stage from the second operational mode to the first operational mode.

9. The switched-mode power supply according to claim 1, wherein the power stage comprises a first switch and a second switch, and
   wherein the control unit is configured to execute the second operational mode in such a way that during a first phase the control unit turns on the first switch and turns off the second switch, and during a second phase the control unit turns off the first switch and turns on the second switch.

10. The switched-mode power supply according to claim 1, wherein
    the switched mode power supply comprises one or more of a direct current to direct current converter, a buck converter, and a boost converter.

11. A power supply circuit, comprising:
    a power stage;
    a critical parameter detector configured to detect a critical parameter of the power stage;
    a first control loop configured to control an operation of the power stage according to a first operational mode; and
    a second control loop coupled to the critical parameter detector and configured to selectively control the operation of the power stage according to a second operational mode based on the detected critical parameter, and to return the power stage to the first operational mode based on a measurement of a first time interval,
    wherein the power stage comprises a first switch and a second switch, wherein the first control loop is configured such that the first switch and the second switch are opened and closed in an alternate manner, and wherein the second control loop is configured during the first time interval to turn the first switch on and the second switch off and during a second time interval to turn the first switch off and the second switch on.

12. The power supply circuit according to claim 11, wherein the critical parameter detector is configured to detect if the critical parameter leaves a pre-determined range and to detect if the critical parameter re-enters the pre-determined range.

13. The power supply circuit according to claim 11, further comprising:

an input voltage detector.

14. The power supply circuit according to claim 11, wherein the components operate together as a switched-mode power supply, wherein the switched-mode power supply comprises one or more of a direct current to direct current converter, a buck converter, and a boost converter.

15. A direct current to direct current converter, comprising:

a power stage comprising a first switch, a second switch, an inductor and a capacitor;

a critical parameter detector configured to detect a critical parameter of the power stage;

a control unit configured to control an operation of the first switch and the second switch and to change the power stage operation from a first operational mode to a second operational mode if the critical parameter leaves a pre-defined range, and further configured to change from the second operational mode to the first operational mode based on a measurement of a first time interval, wherein the control unit is also configured to return the operation of the power stage from the second operational mode to the first operational mode if the critical parameter has re-entered the pre-defined range and a current flowing through the inductor has reached a pre-determined level.

16. The direct current to direct current converter according to claim 15, further comprising:

a first time determination unit configured to determine a length of the first time interval during which the critical parameter is out of the pre-defined range.

17. The direct current to direct current converter according to claim 16, further comprising:

a second time determination unit configured to determine a length of a second time interval based on the first time interval, wherein during the second time interval the critical parameter is within the pre-defined range and after the second time interval the control unit changes the operation of the power stage from the second operational mode to the first operational mode.

18. The direct current to direct current converter according to claim 17, wherein the first time determination unit comprises an accumulation device, wherein the accumulation device is initialized at a beginning of the first time interval, active during the first time interval, and inactive after the first time interval.

19. A method for operating a switched-mode power supply, the switched-mode power supply comprising a power stage, the method comprising:

controlling an operation of the power stage according to a first operational mode;

detecting a critical parameter of the power stage;

changing from the first operational mode to a second operational mode of the power stage if the critical parameter leaves a pre-defined range;

measuring a first time interval during which the critical parameter is out of the pre-defined range;

changing from the second operational mode to the first operational mode depending on the measured first time interval; and determining a length of a second time interval based on the first time interval, during which second time interval a current flowing through an inductor of the power stage has reached a pre-determined level.

20. The method according to claim 19, wherein the power stage comprises a first switch and a second switch, the method further comprising:

controlling the operation of the power stage according to the second operational mode, wherein the controlling includes turning a first switch on and a second switch off during the first time interval, and then turning the first switch off and the second switch on in a second time interval.

21. The method according to claim 19, further comprising:

changing from the second operational mode to the first operational mode if the critical parameter has re-entered the pre-defined range and a current flowing through an inductor of the power stage has reached a pre-determined level.

* * * * *